United States Patent
Fraden

[11] Patent Number: 6,129,673
[45] Date of Patent: Oct. 10, 2000

[54] INFRARED THERMOMETER

[75] Inventor: Jacob Fraden, La Jolla, Calif.

[73] Assignee: Advanced Monitors, Corp., San Diego, Calif.

[21] Appl. No.: 09/093,464

[22] Filed: Jun. 8, 1998

[51] Int. Cl.⁷ .................... A61B 5/00; G01J 5/00
[52] U.S. Cl. ............................ 600/474; 600/549
[58] Field of Search .................... 600/474, 549; 374/128, 129, 190, 194

[56] References Cited

U.S. PATENT DOCUMENTS

| | | | |
|---|---|---|---|
| D. 396,421 | 7/1998 | Barthelemy et al. | |
| 2,865,202 | 12/1958 | Bennett | 73/355 |
| 3,023,398 | 2/1962 | Siegert | 340/51 |
| 3,282,106 | 11/1966 | Barnes | 73/355 |
| 3,581,570 | 6/1971 | Wortz | 73/355 |
| 3,872,726 | 3/1975 | Kauffeld et al. | 73/362 |
| 3,978,325 | 8/1976 | Goldstein et al. | 73/359 |
| 4,544,441 | 10/1985 | Hartmann et al. | 156/634 |
| 4,602,642 | 7/1986 | O'Hara et al. | 128/664 |
| 4,797,840 | 1/1989 | Fraden | 364/557 |
| 5,012,813 | 5/1991 | Pompei et al. | 128/664 |
| 5,150,969 | 9/1992 | Goldberg et al. | 374/128 |
| 5,169,235 | 12/1992 | Tominaga et al. | 374/129 |
| 5,368,038 | 11/1994 | Fraden | 128/664 |
| 5,458,121 | 10/1995 | Harada | 128/664 |
| 5,522,662 | 6/1996 | Shiokawa | 374/130 |
| 5,653,238 | 8/1997 | Pompei | 128/664 |
| 5,991,652 | 11/1999 | Barthelemy et al. | 600/474 |

*Primary Examiner*—Marvin M. Lateef
*Assistant Examiner*—Shawna J. Shaw
*Attorney, Agent, or Firm*—Baker & Maxham

[57] ABSTRACT

An infrared (IR) thermometer for performing temperature measurement of an object without having contact with the object. The IR thermometer comprises at least one IR sensing element which, upon exposure to IR radiation, produces a response. The IR sensing element comprises a flat thermistor flake supported by a substrate. The IR thermometer further comprises a processing circuit which analyzes the response to predict the steady-state response of the at least one IR sensing element and temperature of the object. In one embodiment, the processing circuit may obtain two or more responses separated by a predetermined period of time to predict temperature of the object. The processing circuit may also associate reference data in its prediction algorithm.

20 Claims, 6 Drawing Sheets

INFRARED THERMOMETER

BACKGROUND OF THE INVENTION

1. Field of the Invention

The invention relates generally to a device which measures temperature of an object, such as a thermometer. More particularly, the invention relates to a system and method for measuring temperature using an infrared detector, without having contact with the object.

2. Description of the Related Art

I. Infrared Thermometers

Infrared (IR) thermometers are devices which measure temperature without having physical contact with the object being measured (the "object"). The IR thermometer detects intensity of IR radiation which is naturally emanated from the object's surface. For objects having temperatures in the range of 0°–100° C., the IR thermometer uses an IR sensor which detects IR radiation having wavelengths between 3 and up to approximately 40 micrometers ($\mu$m). IR radiation having such wavelengths is commonly referred to as "thermal" radiation. An example of such an IR thermometer includes a medical ear thermometer which measures temperature from the tympanic membrane and surrounding tissues of an ear canal without contact.

The IR thermometer typically includes a housing which may have a variety of shapes depending on its application. It is desirable that the housing have a probe containing a thermal IR sensor which receives and detects IR radiation from the object. In medical applications, the probe typically has a shape suitable for insertion into an ear canal. Moreover, the IR thermometer may include some additional features which may aid in inserting the probe into the ear canal. For example, U.S. Pat. No. 4,993,419 issued to Pompei et al. discloses such additional features.

II. Infrared Sensors

Typically, a thermal IR sensor comprises a housing having a transparent IR window at its front end, and at least one sensing element therein. The sensing element responds to thermal radiation energy (i.e., IR flux) which enters the sensor through the IR window. The sensing element is characterized by a thermal time constant which is directly proportional (by a factor $\frac{1}{12}$–$\frac{1}{10}$) to the time needed for the sensing element to reach a steady-state level. The IR sensor produces an electric response representing the net IR flux existing between the sensing element and the object. Using appropriate data processing techniques, the electrical response may be related to the object's temperature. Typically, at least two types of data are used in calculating temperature of the object's surface. The first data includes the magnitude of the IR flux, and the second data includes a reference temperature. The reference temperature is measured using one of several conventional contact temperature detectors, such as a semiconductor, thermistor, or thermoelectric detector. To measure surface temperature of the object, the IR thermometer detects and converts IR radiation into electrical signals suitable for processing by conventional electronic circuits.

There are several types of IR sensors which may be used to accomplish this task. These IR sensors include quantum and thermal detectors. A brief description of each of these IR sensors is provided below.

The IR sensor used in measuring the net IR flux requires a special opto-electronic detector which is responsive to thermal radiation flux (e.g., IR flux). IR radiation has electromagnetic properties and, thus, may be detected using opto-electronic type detectors, such as a quantum detector or thermal detector. The quantum detector, such as a photoresistor, requires cryogenic cooling since when operating near room temperatures, it generates an unacceptably high noise level. On the other hand, a thermal detector may operate at normal room temperature without the need for cooling devices. Thermal detectors include thermopiles, pyroelectrics, bolometers, and active far infrared (AFIR) detectors.

Some IR thermometers employ focusing optics for narrowing their fields of view. This may be required when temperature is measured from remote objects. On the other hand, IR thermometers for measuring temperature from a cavity, such as a human ear, produce better results with a wide field of view. A wide angle improves the accuracy of measurement, and makes the measurement less dependent on the operator's technique. For further information on such wide-field IR thermometers, reference is made to U.S. Pat. No. 4,797,840 issued to Fraden, and U.S. Pat. No. 5,368,038 issued to Fraden.

The bolometer IR sensor is a thermistor-based IR sensor which includes a temperature sensitive resistor. Due to its relatively large thermal mass (as compared with thermopiles), a bolometer is slow in detecting IR radiation, unless fabricated on thin membranes. To improve its response speed, the bolometer is sometimes made to be very small in size and is supported by tiny wires. However, this configuration makes it impractical for medical applications. Other bolometers are made as film bolometers. An example of a film bolometer is disclosed in U.S. Pat. No. 4,544,441 issued to Hartmann et al. However, the film bolometer IR sensor is comparatively costly and suffers from poor sensitivity, nonlinearity, poor manufacturer's tolerances, and drifts. Thus, film bolometer sensors are seldom employed in IR thermometers.

IR thermometers having a bolometer sensor suffer from two major drawbacks: a slow speed of response, and a high sensitivity of the output signal to thermistor tolerances. For example, to achieve a reasonable accuracy in a medical infrared thermometer, it is desirable that the thermistor bolometers that are connected in a bridge circuit maintain a mutual stability over the lifetime of the device. This stability is of the order of 10 ppm or 0.001%—an extremely tight tolerance which is not readily achievable at present state of technology. Prior efforts have failed to teach how these sensors may be implemented to achieve fast response and maintain high sensitivity, without resorting to complex and expensive designs. For more information on these efforts, reference is made to U.S. Pat. No. 3,581,570 issued to Wortz, U.S. Pat. No. 3,282,106 issued to Barnes, U.S. Pat. No. 2,865,202 issued to Bennet, and U.S. Pat. No. 3,023,398 issued to Sieget.

III Accuracy

Present IR thermometers suffer from disturbances and interferences. Interferences may include, among other things, mechanical and electrical noise, aging of components, thermal drifts, manufacturer's tolerances, nonlinearity, and effects of ambient temperature. One way of compensating for additive noise has included employing a dual sensor. A dual sensor comprises a sensor having two sensing elements which are connected in a bridge circuit. Employing a dual sensor may reduce errors from interferences which influence both sensing elements in an identical manner. For interferences which affect both elements in a different manner, canceling drifts may be achieved by subtracting an IR reference signal from the detected signal. This technique, however, is less effective when applied with the bolometer sensor. This is true since the output signal from the bolometer sensor includes a high bias component which depends on ambient temperature and which may not be effectively canceled by the reference technique. For more information on this technique, reference is made to U.S. Pat. No. 4,602,642 issued to O'Hara et al. and U.S. Pat. No. 5,169,235 issued to Tominaga et al.

IV Response Speed

In thermopiles and some bolometers, a very thin-membrane detector having a thickness of about 1 $\mu$m is used to achieve a fast response. The use of a thin membrane sensor results in higher cost and limits the size of a detector. In pyroelectric sensors, the speed is achieved by measuring the rate of temperature change instead of actual temperature, and this requires use of a mechanical shutter, thereby adding more hardware and complexity. In AFIR sensors, a servo-loop is used to achieve a fast response. However, the use of a servo-loop introduces more noise, potential sensor instability, and calibration difficulties.

Except for pyroelectric sensors, IR thermometers rely on achieving a steady state level of the output signal following exposure of the sensor to the net IR radiation. In fast sensors, such as thermopiles and AFIRs, this level is reached within 0.2–1.0 second following exposure of the sensor to a thermal step function. In slow sensors, like the bulk thermistor bolometers, tens of seconds and even minutes may be needed to achieve a steady-state level. The need for reaching a steady-state level is not unique to IR sensors, but is also common to conventional contact thermometers. For instance, a mercury-in-glass thermometer typically takes about 3 minutes to measure human temperature orally, because the patient has to wait until the temperature of the mercury bulb reaches that of the sublingual cavity. Contact thermometers which require a steady-state level to be reached are commonly referred to as "equilibrium" thermometers. As used herein, the term "equilibrium" refers to substantially near equality, and not necessarily exact equality, of temperatures of the object and the sensor. Also, the term "conventional" thermometry refers to "contact," non-IR thermometry.

In conventional thermometry, a predictive technique is applied to quickly achieve results from a slow response sensor. In general, a predictive technique relies on an algorithmic data processing of output signals from a conventional sensor. Some predictive techniques rely on software-based data processing, and others on hardware-based implementations. In using predictive techniques, the equilibrium level between the sensor and the object is not achieved, but is, rather, mathematically computed (i.e., predicted) based upon more than one sample of a changing sensor's response. Hence, the temperature measurement and display of the predicted temperature may be accomplished before equilibrium is reached. For more information on this technique, reference is made to U.S. Pat. No. 3,978,325 issued to Goldstein et al., and U.S. Pat. No. 3,872,726 issued to Kauffeld et al.

In IR thermometry, however, the predictive technique of conventional thermometry is very difficult and, in many cases, impossible to apply due to several factors. One factor is due to the inability of the IR sensor to reach the object's temperature. Even for a very hot object, the temperature of the sensing element of an IR sensor may still differ from the sensor's housing temperature by a few tenths of a degree, no matter how long one may wait. Therefore, conventional predictive algorithms may not predict the correct temperature of the object. Another factor is the inaccuracy of the predictive technique in the presence of noise. To achieve a reasonably high signal-to-noise ratio (SNR), the sampling period of the signal (and, subsequently, the time of prediction) should be close to a thermal time constant of a sensing element and, preferably, longer. For example, if the thermal time constant of a bolometer is 5 seconds, the equilibrium response would be about 1 minute and the predictive response is 5 seconds or longer. However, both of those times are too long for many applications. Considering the increased error and longer measurement times required to achieve acceptable results, a predictive technique does not lend itself to use in IR thermometry.

Therefore, there is a need in temperature measurement technology for a system and method which achieves a fast and accurate response using IR thermometry. Such a system should be easy to implement and cost effective in medical and veterinary applications, for example.

SUMMARY OF THE INVENTION

To overcome the limitations of the prior art, the invention provides a method and system for performing non-contact temperature measurement of an object accurately and efficiently. In one embodiment, the invention provides an infrared (IR) sensing assembly which measures temperature of an object. The sensing assembly comprises at least one IR sensing element which senses IR radiation and/or ambient temperature. The sensing assembly further comprises a processing circuit electrically connected to the at least one IR sensing element. The processing circuit receives signals from the IR sensing element and predicts the temperature of the object. In another embodiment, the invention provides a method of measuring temperature of an object using infrared (IR) radiation. The method comprises the step of exposing at least one IR sensor to IR radiation from the object to produce at least one IR sensor response. The method further comprises the step of predicting the temperature of the object based on the at least one IR sensor response.

BRIEF DESCRIPTION OF THE DRAWINGS

The above and other aspects, features, and advantages of the invention will be better understood by referring to the following detailed description, which should be read in conjunction with the accompanying drawings, in which.

DETAILED DESCRIPTION OF THE INVENTION

The invention provides a system and method which employ a bolometer (i.e., thermistor) based sensor in an IR thermometer to perform non-contact measurement of an object's temperature. The bolometer-type sensor responds to IR radiation emanated from the object by changing its electrical resistance, thereby producing an electrical response. The IR thermometer of the invention uses the electrical response to significantly reduce the response time of a bolometer-type IR sensor by application of a predictive technique to produce a response time of about 1 second. The fast response of the present invention makes it possible and practical to apply the IR thermometer in medical and veterinary applications, for example.

Figure 1:
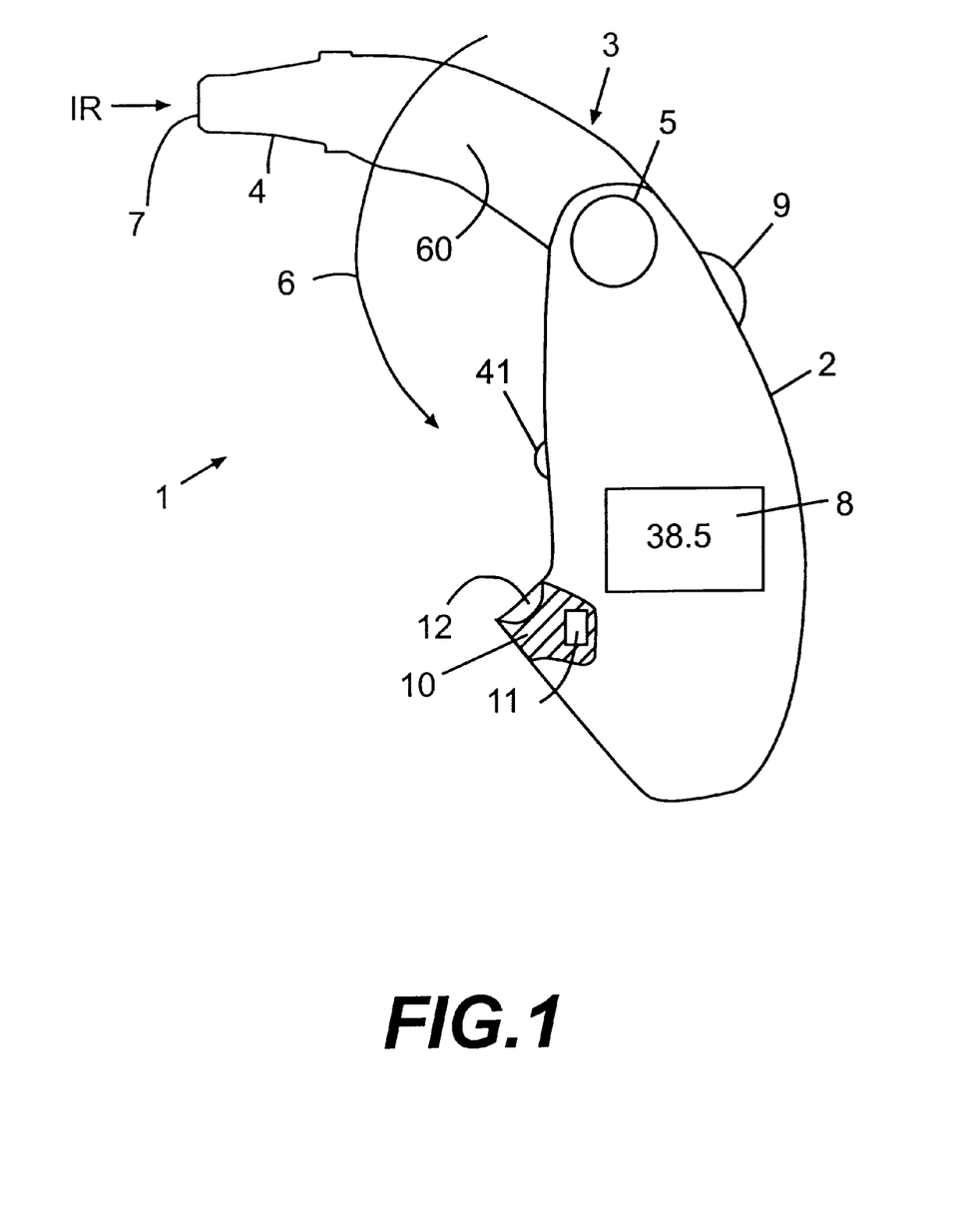
FIG. 1 is a side view of one embodiment of the IR thermometer of the invention.

To produce a bolometer-based IR thermometer having a practical application, two major problems are solved: accuracy of the temperature measurement under varying ambient conditions and thermistor aging, and response speed. FIG. 1 is a side view of one embodiment of the IR thermometer of the invention. As shown in FIG. 1, the IR thermometer 1 may have a shape of a hand-held instrument. The IR thermometer 1 comprises an arm 3 connected to a case 2 via a pivot 5 which extends through a portion of the arm 3, and is secured in an adjacent end of the case 2, thereby allowing rotation of the arm 3 around the pivot 5, in relation to the case 2. The arm 3 and case 2 are two mutually movable parts, with respect to each other. The arm 3 may have a curved cylindrical shape, or a variation thereof, having a hollow interior suitable for passing electrical connections therethrough. The arm 3 may rotate in a direction defined by the arrow 6 (i.e., inwardly) around pivot 5 from a measuring (open) to a reference (closed) position, and vice versa. The exemplary view of FIG. 1 shows the arm 3 in the measuring position.

The case 2 comprises a button 9 emerging from the top surface of the case 2 suitable for pressing by an operator's thumb to initiate temperature measurement, or perform other thermometer functions. The case 2 further comprises a display 8 placed on a lateral surface of the case 2 suitable for easy reading by an operator. It is worth noting that the location of the button 9 and display 8 is not material to the invention and, hence, the button 9 and display 8 may be located anywhere that is convenient for its respective purpose. To perform and record a temperature measurement, an operator depresses the button 9 briefly. The display 8 may include a liquid crystal display (LCD) or a light emitting diode (LED) screen. Other types of displays suitable for this purpose and which are well known in the art may be used. The display 8 shows the recorded temperature of the object in analog or digital form representing temperature of the object in degrees Centigrade, Fahrenheit, or Kelvin.

The arm 3 includes two distinct portions: a probe 4 defining a distal portion having a cone-like shape, and a slightly inwardly curved proximal portion 60. The probe 4 houses an IR sensor (not shown in this figure) inside. The probe 4 may be connected to the proximal portion 60 using suitable adhesive, such as epoxy, or mechanical techniques, such as by screwing or snapping the proximal portion 60 into the probe 4. The proximal portion 60 is slightly curved inwardly for ease of positioning the probe 4 inside an animal ear. The inward curvature and tilting of the arm 3 at about 30° with respect to the housing and of the probe at about another 30° with respect to the arm makes insertion of the probe into the animal's ear more convenient and ergonomical.

When the arm 3 is placed in the reference position, a front end 7 of the probe 4 faces a cavity 12 of a reference target 10 located on the bottom surface of the case 2, and activates a switch 41 (see FIGS. 4 and 5) located on the same bottom side of the case 2 and above the cavity 12. When the front end 7 is in the reference position, it is desirable to have its field of view clear of objects other than the reference target 10. The reference target 10 includes a contact temperature sensor 11 which provides a reference temperature for use in data processing. A spherical concave surface forming a cavity 12 is incorporated in the reference target 10 to reduce reflections from spurious objects. Other types of surfaces may also be used for this purpose, such as a flat surface, although such a surface may have a somewhat reduced efficiency. The surface of the cavity 12 may be coated with material having high emissivity in the IR spectral range. For instance, the coating material may comprise an organic paint or metal oxide.

The IR thermometer 1 may resemble a jack-knife where the probe 4 has a profile suitable for insertion into an ear canal of a human or animal. The probe 4 may be covered by a disposable protective probe cover (not shown in this figure) to prevent the probe from contamination by soiling compounds, such as ear wax, and to prevent transmission of contagious biological components from one patient to another. It is desirable to have the probe cover transparent to IR radiation. In the measurement position, the probe 4 may be inserted into the ear canal where it detects the magnitude of IR flux generated by the object.

Figure 2:
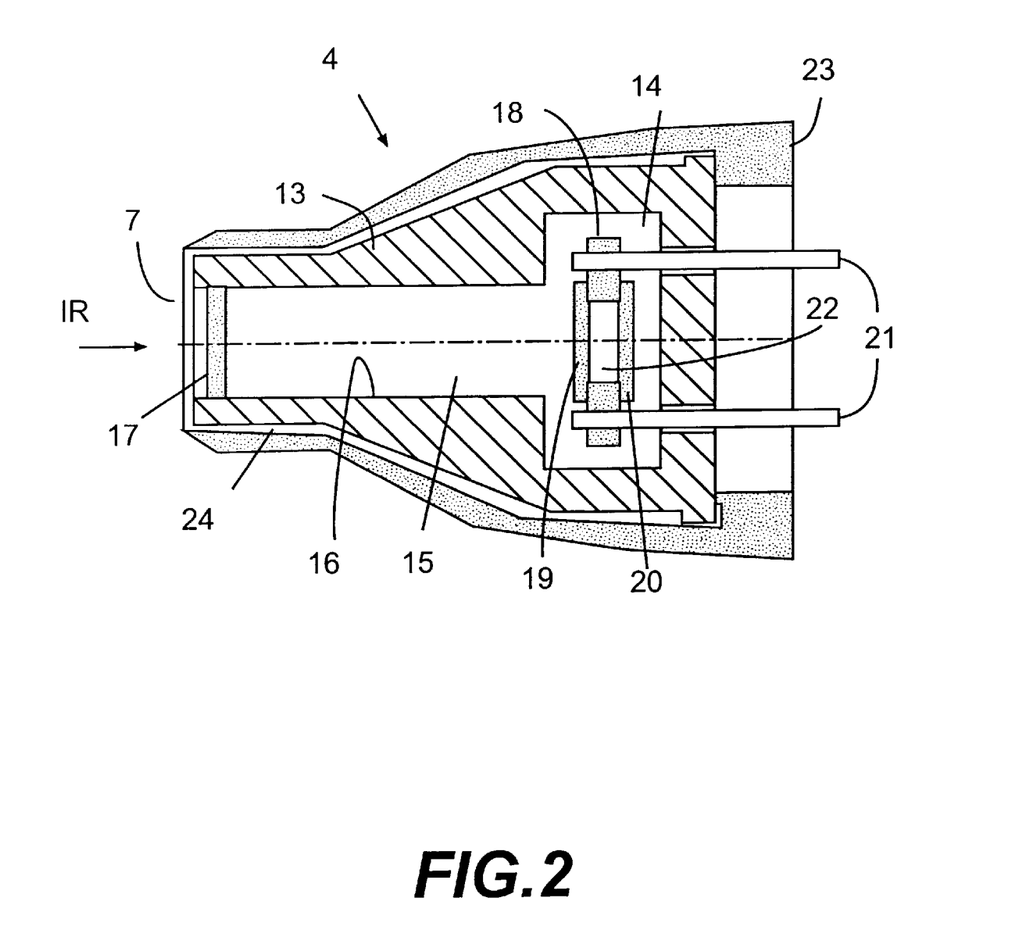
FIG. 2 is a cross-sectional view of the IR probe section of the IR thermometer of FIG. 1.

FIG. 2 is a cross-sectional view of one embodiment of the probe 4 of FIG. 1. The probe 4 may comprise a hermetically sealed shell 13 which is encapsulated inside a speculum 23. The speculum 23 may have a shape adapted for insertion into the ear canal with an attached probe cover, if so desired. It is desirable to have the shell 13 be fabricated of any metal having a good thermal conductivity such as, among others, copper, brass, zinc, or aluminum. The shell 13 aids in creating a thermal equilibrium among internal components of the IR sensor. It is desirable that the speculum 23 be made of any suitable material having low thermal conductivity such as, among others, ABS or nylon plastic. To reduce thermal coupling between the speculum 23 and shell 13, an insulation layer, such as a gap 24, a foam layer, or other similar insulation material, may be placed between the separation of the speculum 23 and shell 13. Nonetheless, a minimal area of the shell 13 may remain in contact with the speculum 23 at the base of the shell 13 to maintain the shell 13 in its place. These features minimize heat transfer from the external environment into the side walls of the probe 4.

A waveguide 15 is defined by an inner surface 16 of the shell 13, and extends from the front end 7 of the probe 4 rearwardly to a location in the central to rear portion of the probe 4. The waveguide 15 communicates, at its rearward end, with a sensing chamber 14 formed by the base (i.e., rear end) of the shell 13. The waveguide 15 is typically a hollow channel having a highly reflective inner surface 16. For better reflectivity in the IR spectral range, it is desirable to have the surface 16 smooth and shiny and, preferably, plated with a highly reflective metal, such as gold or similar material. The front opening of the waveguide 15 is covered by a window 17 adjacent to the front end 7. The window 17 is typically transparent in the IR spectral range, e.g., between 3 and 15 $\mu$m. The window 17 may be fabricated from silicon, germanium, zinc selenide, or other suitable material. One or both surfaces of the window 17 may be provided with an anti-reflective coating to minimize loss due to reflection of the IR radiation.

A sensing assembly located at the base of the shell 13 comprises a first thermistor 19 and a second thermistor 20 placed inside the sensing chamber and separated by a supporting substrate 18. The sensing assembly connects to two terminals 21 extending from the substrate to the proximal portion 60. The two terminals 21 communicate electrical signals to processing circuits in the IR thermometer 1 (see FIGS. 4 & 5). The substrate 18 may have a void 22 between the first thermistor 19 and second thermistor 20 to ensure better thermal separation therebetween. The second thermistor 20 is positioned within the chamber to be exposed only to the environment of the sensing chamber 14. The second thermistor 20 is substantially shielded from direct IR radiation, and faces away from the front end 7 of the probe 4, to primarily respond to the inner temperature of the sensing chamber 14, hereinafter referred to as the ambient temperature (i.e., temperature of the "ambiance"), $T_a$. In addition to the ambient $T_a$, the first thermistor 19 is positioned within the chamber to be exposed to the waveguide 15 and, consequently, to IR radiation entering the probe 4 through the window 17. Thus, the first thermistor 19 responds to both the ambient temperature of the chamber and IR energy absorbed by its surface which faces the waveguide 15. The reflective surface 16 helps to direct IR rays from a wide angle of view towards the thermistor 19 via one or more reflections in a zigzag-like manner.

Typically, each of the first thermistor 19 and second thermistor 20 comprises a temperature-sensitive resistor whose electrical resistance varies as a function of temperature and according to a predetermined electrical rule. It is desirable that each of the first thermistor 19 and second thermistor 20 be fabricated in a shape of a relatively large, flat plate. Each flat plate is thermally insulated from the other by the substrate 18. It is desirable that the only thermal coupling between the two thermistors occurs via the surrounding gas and the substrate 18. The flat shape of the two thermistors allows their surface area to be maximized and simplifies the manufacturing process. While the use of other shapes for the two thermistors is possible, such as a cylindrical shape, the flat shape appears to be more economical and practical.

To improve long term stability of sensor components, the volume enclosed by the shell 13 may be filled with dry air, nitrogen, or other inert gas, and then hermetically sealed. The hermeticity of the sensing chamber 14 may be achieved by using epoxy on the window 17, and welding the shell 13 during the assembly process. Alternatively, the shell 13 may be sealed using soldering, adhesive or clamping with one or more sealing gasket, such as an o-ring (not shown in this figure). These sealing methods are well known in art and, hence, not further described herein.

It is desirable to have the two thermistors be highly sensitive to IR radiation, and produce a substantially identical and simultaneous response to environmental factors. To achieve high sensitivity to IR radiation, the thermistors are thermally insulated from each other and from the surrounding components. To produce a substantially identical and simultaneous response, the thermistors are well coupled to each other and the surrounding components.

Figure 3:
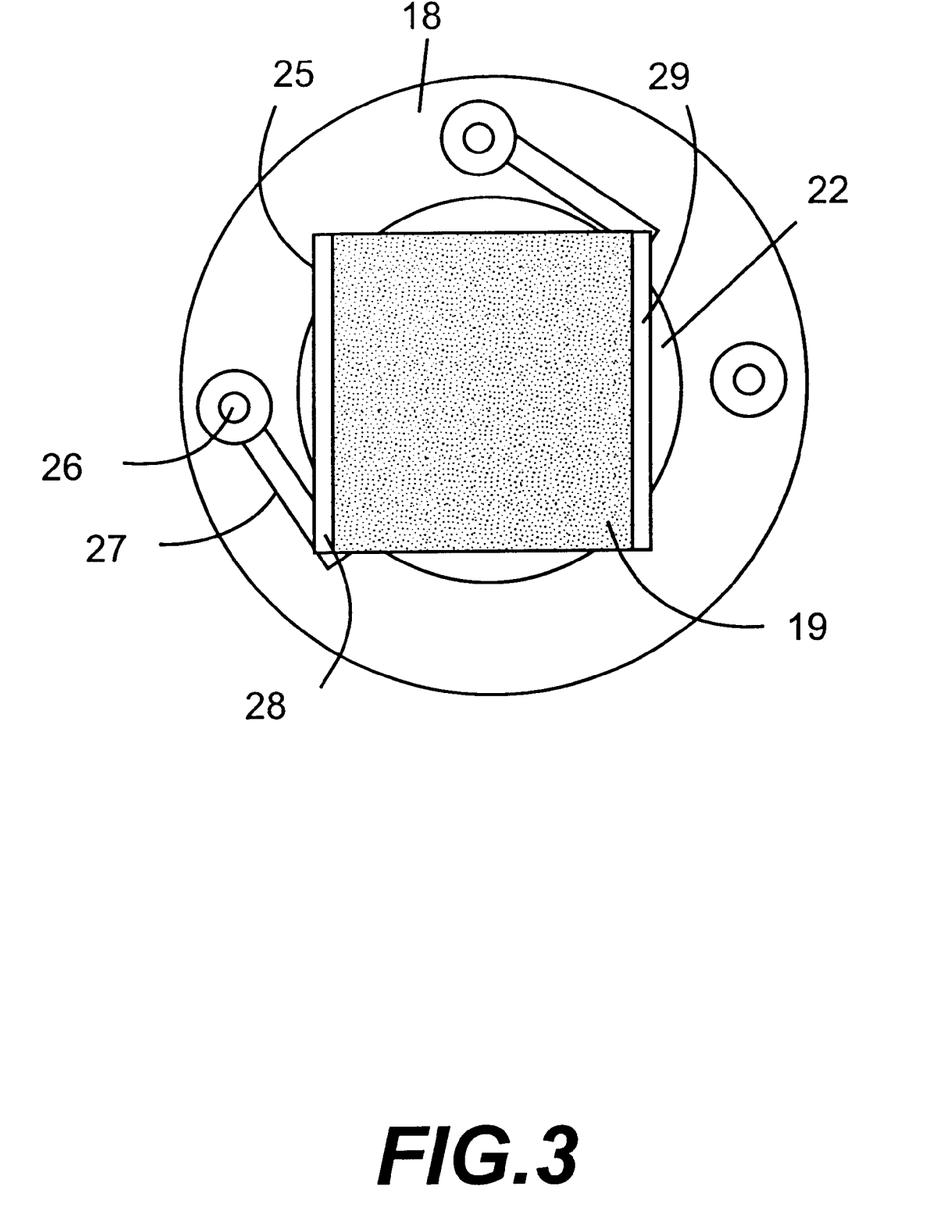
FIG. 3 is a top plan view of a sensing assembly employed in the IR probe of FIG. 2.

FIG. 3 is a top plan view of the sensing assembly employed in the IR probe of FIG. 2. The sensing assembly comprises the substrate 18, a first thermistor 19 (i.e., a temperature sensing element) and a second thermistor 20 (not shown in this figure). The first thermistor 19 and second thermistor 20 (collectively the "two thermistors") are placed on opposite surfaces of the substrate 18. As noted above, this placement allows the exposure of the first thermistor 19 to IR radiation while shielding the second thermistor 20 on the opposite side from IR radiation. Each of the two thermistors comprise a temperature sensing element made up of a thermistor flake having, in one embodiment, a rectangular shape. Typically, the length of the side of such thermistor ranges from 1 to 5 millimeters (mm) with a thickness ranging from 0.1 to 0.5 mm. At room temperature (e.g., 20°–25° C.), the thermistor may have any suitable resistance. However, to minimize the effects of self-heating and reduce power consumption, the thermistor typically has a resistance of 10 kOhm or more. It is desirable that the thermistor resistance be in the range from 100-kOhm to 500-kOhm. At room temperature, the sensitivity of a thermistor to temperature may be in the range from 2 to 5%/°K, where K is degrees Kelvin.

To electrically connect and mechanically support the thermistor 19 on the substrate 18, two or more electrodes 25 and 29 (collectively the "two electrodes") are bonded on opposite sides of the thermistor 19. As used herein, the term electrode refers to a metal layer which is intimately bonded with the thermistor's body. The electrode may be formed by plating, screen printing, dipping, and any other suitable process, commonly used in the thermistor manufacturing process. For a better IR response, it is desirable is to minimize areas of each of the two electrodes and maximize the area between the two electrodes. As shown in FIG. 3, each of the two electrodes extends over the entire length of one side of the thermistor 19. The resistance of each of the two thermistors is a function of temperature, its material composition, thickness of the plate, area of the electrodes and distance between the two electrodes. IR radiation is primarily absorbed by the area which is not covered by the two electrodes. Hence, it is desirable that the electrodes not occupy the area of the thermistor 19 which absorbs the IR radiation. The thermistor 20 is bonded to the substrate 18 in a similar manner. Generally, each of the two thermistors has a good emissivity (i.e., absorption) in the region between the two electrodes. However, to further improve ability of a thermistor to absorb IR radiation, the thermistor 19 and thermistor 20 may be coated with an IR absorbing coating selected from those which are well known in art.

To maintain thermal balance between the two thermistors, the substrate 18 may be made of dielectric material having good thermal conductivity, such as alumina or beryllia. Each of the two electrodes is soldered, epoxied (through conductive epoxy), or wire bonded to its respective conductor 27. Each conductor 27 is connected to a pad 26 printed on the surface of substrate 18. The pad 26 connects each conductor 27 to each of the two terminals 21 (see FIG. 2). As noted above, the substrate 18 contains a void 22 approximately in its center occupying the volume between the two thermistors. This arrangement causes each of the two thermistors to contact the substrate 18 only near its respective four corners. This arrangement reduces thermal coupling between each of the two thermistors and the substrate 18 to improve the response speed and sensitivity of the two thermistors. To better secure each of the two thermistors on the substrate 18, each of the two thermistors may be additionally attached to the substrate 18 by non-conductive epoxy in other desired areas (not shown in this figure).

The above-described IR sensor (i.e., sensing assembly) is highly optimized to achieve a desirable magnitude and speed of response to IR radiation. The invention applies a predictive method to IR thermometry. As noted above, in IR thermometry, temperature of an IR sensor does not generally reach the temperature of the object. Upon exposure to IR radiation (i.e., flux) from the object, temperature of the IR thermistor typically changes by only a small fraction of a degree K. When executing the predictive algorithm, the IR thermometer 1 anticipates a steady-state level of the output of the IR thermistor based upon the exposure to the IR flux at a given ambient temperature.

Figure 4:
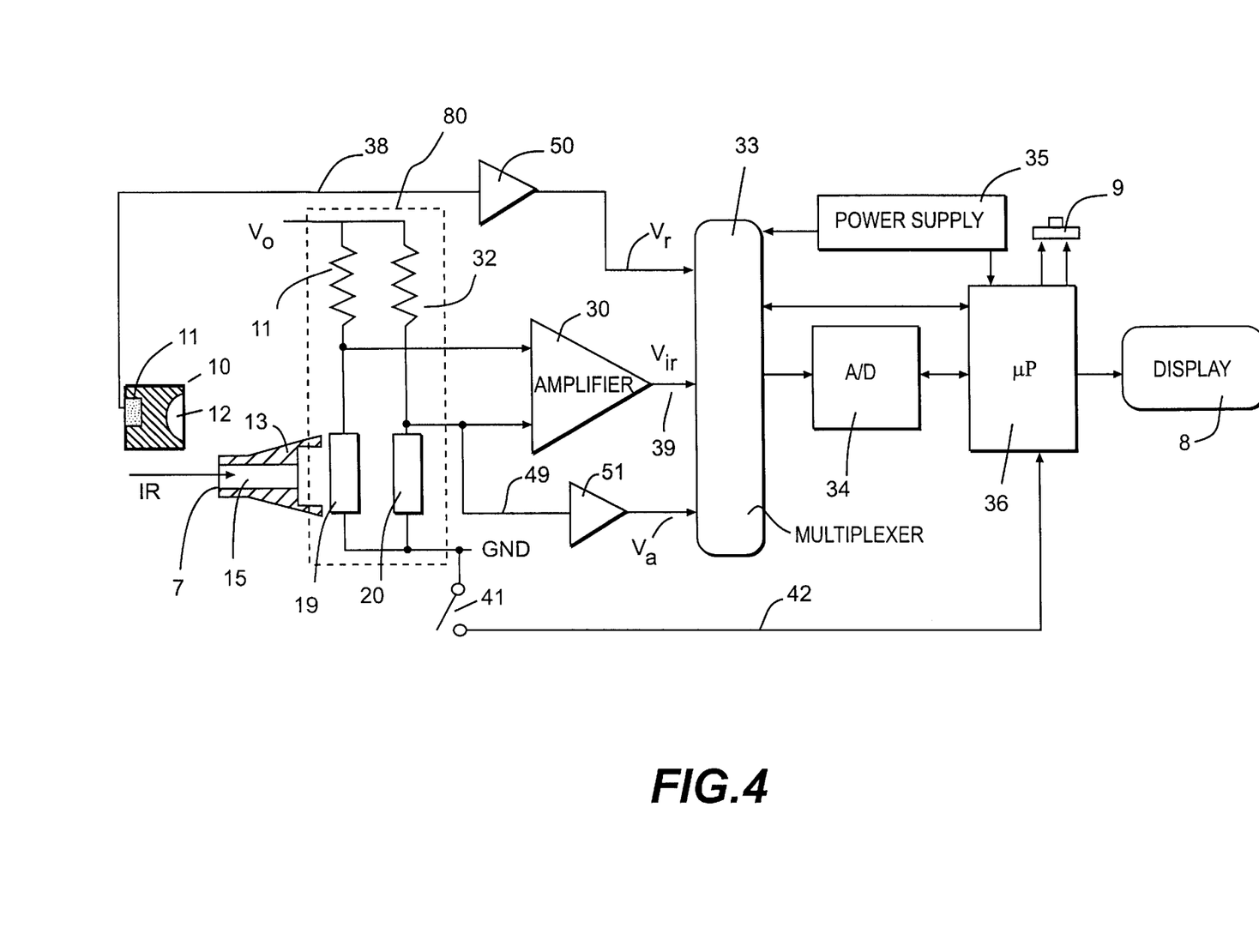
FIG. 4 is a block diagram of one embodiment of a processing circuit for use in the IR thermometer of FIG. 1.

FIG. 4 is a block diagram of one embodiment of a processing circuit as implemented in the IR thermometer of FIG. 1. The two thermistors are electrically connected in a Wheatstone bridge 80 configuration with a first pull-up resistor 31 and a second pull-up resistor 32. The output voltage $V_o$ represents the excitation voltage. Typically, each arm (i.e., a thermistor and a resistor) of the bridge 80 may produce a high bias signal. An analog multiplexer 33 is connected via an amplifier 30 and a follower 51 to the bridge 80 for receiving two inputs therefrom. The first input comprises the output 39 ($V_{ir}$) of the differential amplifier 30 representing the voltage difference between the two arms of the bridge 80. Since the arms of the bridge are nearly symmetrical, a high bias is substantially canceled by the differential amplifier 30. The second input comprises the output voltage ($V_a$) 49 of the ambient sensing arm (i.e., thermistor 20 and resistor 32) is first fed into a follower 51. Moreover, the multiplexer 33 receives a third input comprising the output voltage ($V_r$) 38 from the contact temperature sensor 11, embedded into the reference target 10 (see FIG. 1). This signal is first conditioned by a circuit 50 which may incorporate an amplifier and a level shifter. The three inputs into the multiplexer 33 are fed into an analog-to-digital (A/D) converter 34 to provide information to a microprocessor 36 in digital form. A switch 41 indicates to the microprocessor 36 the position of the arm 3 (i.e., open or closed) via a conducting link 42.

The microprocessor 36 processes all incoming signals, applies the predictive algorithm to the signal $V_{ir}$ 39, calculates the object's temperature $T_b$, and controls the display 8. A power supply 35, such as a battery, is used to power the operation of the entire device. The button 9 produces a connection between the microprocessor 36 and an electrical source which commands the microprocessor 36 to perform a temperature measurement of the object. Some other auxiliary components, such as data storage devices, D/A converters, voltage references, and others, may be added to enhance functionality of the IR thermometer 1.

Prior to performing a measurement, the arm 3 (see FIG. 1) is placed in the closed (i.e., reference) position. The front end 7 of the probe faces the cavity 12 of the reference target 10. Consequently, the switch 41 is closed thereby producing an indication to the microprocessor 36 (via link 42) that the IR signal is being received from the reference target 10. As noted above, the closed position represents a reference phase of the measurement cycle. The microprocessor 36 monitors the temperature $T_c$ of the reference target 10 and stores certain calculations including $T_c$ and the magnitude of the $V_{ir}$ 39, which represents the IR signal detected from the reference target 10. When the $V_{ir}$ 39 is being received from the reference target 10 in FIG. 4, it is represented as $V_{irc}$.

When the arm 3 is placed in the open (i.e., measuring) position, the probe 4 may be inserted into an ear canal so that the front end 7 receives IR flux from the ear canal and, hence, the $V_{ir}$ 39 signal represents the IR signal received from the ear canal. The value of the $V_{ir}$ 39 signal changes generally exponentially. Accordingly, the microprocessor 36 calculates a predicted value $V_{iro}$ in accordance with the following equation:

$$V_{iro} = \frac{V_y - V_x e^{-\frac{t_o}{\tau}}}{1 - e^{-\frac{t_o}{\tau}}} \quad (1)$$

where $V_x$ and $V_y$ are two instant sequential measurements of the changing output voltage $V_{ir}$, within a time interval $t_o$, and $\tau$ is the thermal constant of the thermistor 19. A number of predicted values may be registered and, depending on the application, these numbers may be further processed. For example, the various processing techniques may include selection of the higher or lower voltage value, averaging, comparing the incremental change with a predetermined threshold, and others.

Shortly before or after the measurement of the IR flux from the ear canal, the ambient signal $V_a$ 49 is also measured and fed into the microprocessor to calculate the ambient temperature $T_a$ from a known characteristic of the thermistor. Hence, the microprocessor 36 has all information needed to calculate the temperature of the object. The information includes the signals: $V_{irc}$, $V_{iro}$, $T_a$, and $T_c$. Having this information, the microprocessor calculates a difference between the voltage signals 39 obtained from the reference target 10 $V_{irc}$ and the ear canal $V_{iro}$ as follows:

$$\Delta_{ir} = V_{iro} - V_{irc} \quad (2)$$

The microprocessor further calculates the temperature of the object $T_b$ (in Kelvin) by solving the following equation:

$$T_b = \sqrt[4]{T_c^4 + \frac{2T_a^2 \Delta_{ir}}{V_a C}} + A \quad (3)$$

where C is a gain constant determined during the calibration of the instrument, and A is a corrective function which reduces errors in the measurement (if no correction is required, A may be equal to zero,). As shown by Equation (3), the temperature of the object $T_b$ is a function of four variables: temperature of the reference target 10 ($T_c$), temperature of the ambient sensor ($T_a$), and two readings from the IR thermistor (note that $V_a$ is function of ambient temperature $T_a$). Alternatively, instead of calculating directly from Equation (3), a number of look-up tables may be employed for this purpose. The tables may be based on calibrating the thermometer at various ambient and target temperatures. The method of calculation, however, should not impact accuracy of the results. To accurately measure all constants and variables, it is desirable that the IR thermometer be initially calibrated at known ambient temperatures, and with an object having a known temperature $T_b$. In practice, an object having a known temperature may be a cavity blackbody having an emissivity approaching unity (i.e., 1).

Figure 5:
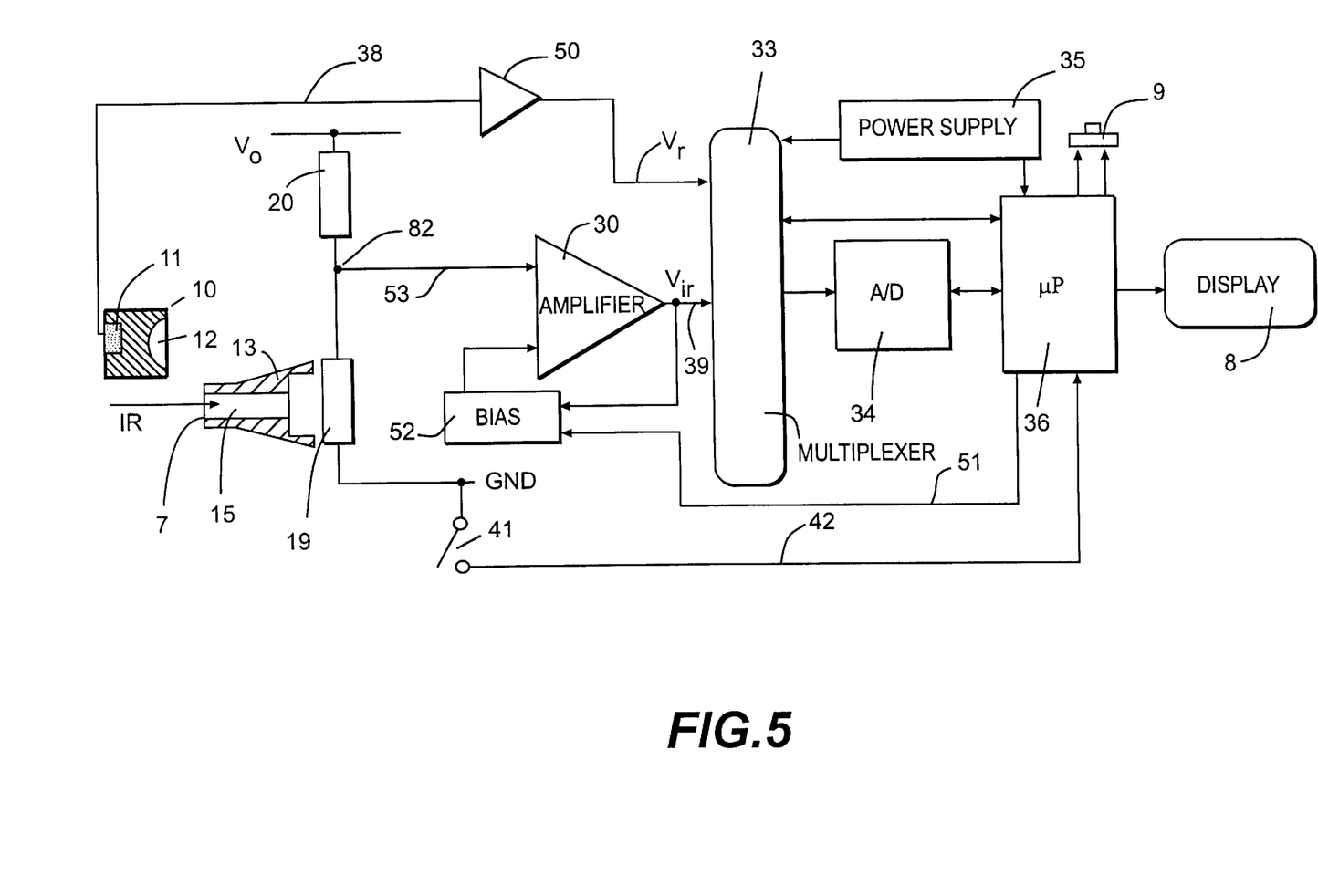
FIG. 5 is a block diagram of another embodiment of a processing circuit for use in the IR thermometer of FIG. 1.

FIG. 5 is a block diagram of another embodiment of a processing circuit as implemented in the IR thermometer of FIG. 1. As shown in FIG. 5, the two thermistors (19 and 20) are serially connected to a reference voltage $V_o$, to form a voltage divider. As noted above, the two thermistors respond in an identical manner to ambient conditions. When the ambient temperature changes, a bias signal 53 from the joint location 82 of the voltage divider remains nearly constant over a broad range of ambient temperature. This eliminates the need for measuring the ambient temperature and reduces a number of the multiplexed channels. The bias signal 53 is deflected in response to IR radiation when the sensor is exposed to the object. The bias signal 53 may still spuriously drift or change somewhat over the varying ambient temperature to the extent that there is a mismatch between the thermistor characteristics. The drift may be compensated for by two functionally identical methods of data processing. The first method is based on a software approach, whereas the second method is based on a hardware approach. The software approach involves a subtraction of the two signals 39 (i.e., $V_{ir}$ and $V_{irc}$). As noted above, the $V_{ir}$ signal 39 is measured when the front end 7 of the probe is aimed at the reference cavity 12 (i.e., closed or reference position). The $V_{irc}$ signal 39 is measured when the probe is aimed at the object, such as the ear canal (i.e., open or measuring position).

The second method involves use of an automatic hardware bias circuit 52 which measures the amplified signal 39 during the reference phase of the operation. When the front end 7 of the probe is exposed to the reference cavity 12, the output signal 39 of the amplifier 30 sets the level of bias at the input of amplifier 30 to a level that compensates for drifts or shifts. When the probe is exposed to the ear canal, a signal is output via a command link 51 to set the bias circuit 52 into a "store" mode. When in the store mode, the bias circuit 52 retains the previously established level of bias for as long as needed for performing the temperature measurement. Thus, a new bias is re-established every time the device goes into the reference phase ("looking" at the reference cavity 12). The bias circuit 52 is of a conventional design and may include a sample-and-hold circuit and/or digital-to-analog converter, as is well known in the art. Hence, the design of the bias circuit 52 is not covered here in detail.

The two above-described methods of data processing require the differential $\Delta_{ir}$, which represents the difference between $V_{ir}$ and $V_{irc}$. Since the ambient temperature channel is eliminated in this embodiment, the target temperature may be calculated from the following equation:

$$T_b = T + C\Delta_{ir} + A \quad (4)$$

where C is the calibrating constant, and A is a corrective function which depends on both the target temperature and reference temperature measured by a contact sensor 11. As shown in Equation (4), the relationship between $T_b$ and A is a linear relationship. The function A compensates for the inherent nonlinearity caused by Stefan-Boltzman law. The function A further compensates for spectral characteristics of the window 17 and the cover of the probe 4. For various combinations of temperatures $T_b$ and $T_a$, various values of the function A are determined experimentally during the calibration of the thermometer 1. Values of the function A may be stored in the thermometer 1 in the form of an equation or a look-up table for use by Equation (4). The function A minimizes the error in calculation. The constant C and function A may provide further corrections for several factors including a less-than-unity emissivity of the object, effects of ambient temperature on the object, thermal gradients inside the object, and others. The actual correction depends on the application and user preference.

Before the microprocessor 36 forwards the temperature to the display 8, it may be pre-processed from a series of values obtained from the Equations 3 or 4. Examples of pre-processing techniques may include the selection of the highest or lowest temperature within a time interval or a number of readings, stable temperature, and temperature falling within a preset range.

Figure 6:
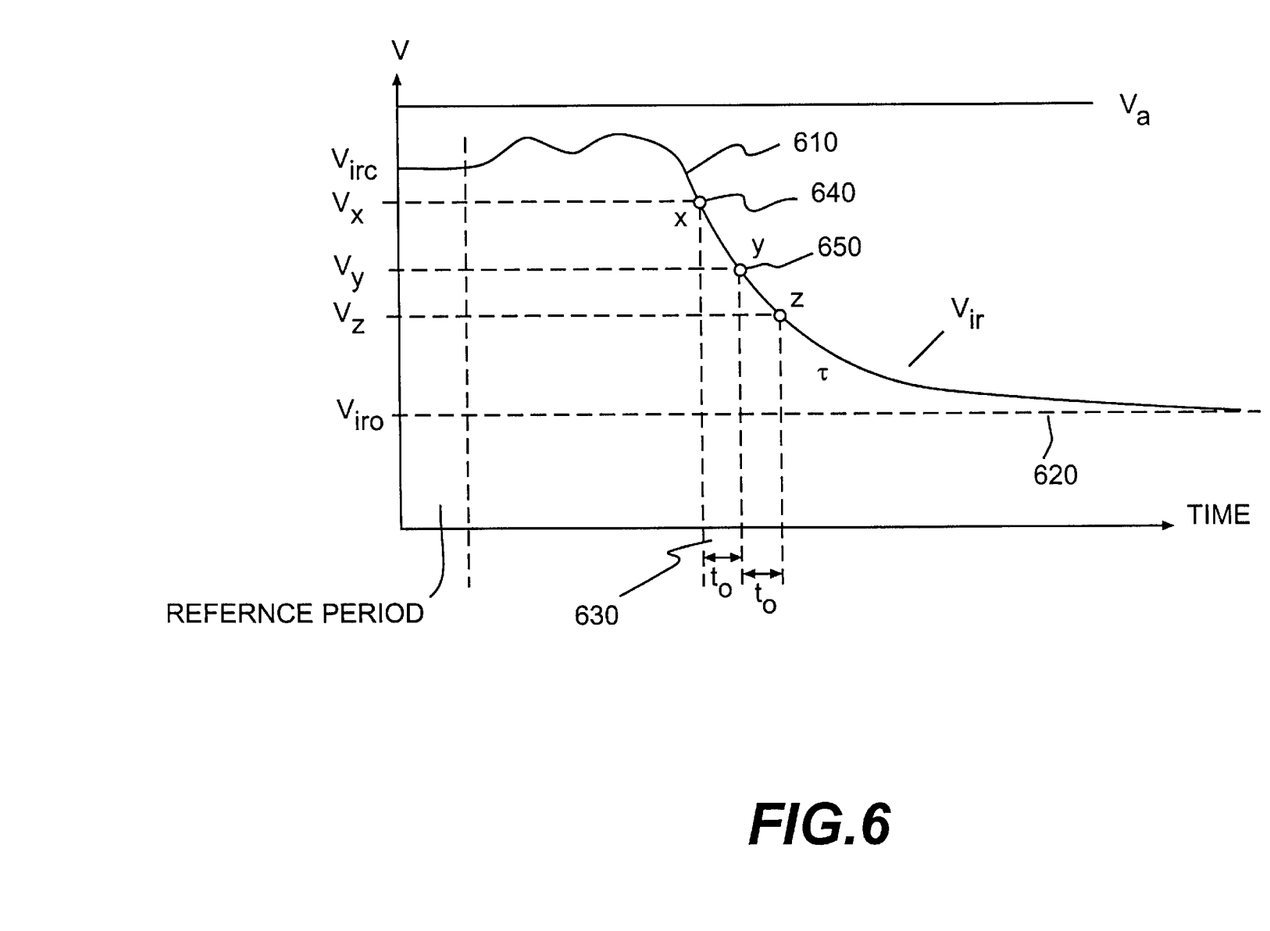
FIG. 6 is a timing diagram of the output of the IR sensing assembly of the probe of FIG. 2.

FIG. 6 is a timing diagram of the output of the IR sensor of FIG. 2. The timing diagram illustrates typical behavior of the output signal which occurs upon exposure of the IR sensor to the object, e.g., upon inserting the probe into the ear canal of a patient. As shown in FIG. 6, the signal $V_a$ generated by the thermistor 20 remains nearly steady. On the other hand, the signal $V_{ir}$ generated by the thermistor 19 changes as a function of time. Typically, the thermistor 19 (which is assembled according to FIG. 2) has a first order response characterized by a thermal time constant $\tau$. In other words, the response pattern of the thermistor 19 follows a near-perfect exponential function. The time constant $\tau$ depends on the thermistor's geometry and its mounting on the substrate as described above. The time constant $\tau$ does not depend on interaction with the object, as in the case of conventional thermometry.

As shown in FIG. 6, when the probe 4 is aimed at the object, the output signal $V_{ir}$ 610 gradually drops (considering that the thermistor has a negative temperature coefficient). If enough time is allowed, the output eventually will reach a steady-state level $V_{iro}$ 620. The time needed to reach the steady-state level $V_{iro}$ 620 may be too long in practical applications. Hence, instead of waiting for measuring the steady-state level $V_{iro}$ 620, that level may be predicted by mathematical calculation. Thus, as noted above, one may take two instant sequential measurements of changing output voltage $V_{ir}$ with a time interval $t_o$ 630, that is, $V_x$ 640 and $V_y$ 650. Then, the level $V_{iro}$ 620 may be mathematically predicted in accordance with Equation (1) (see FIG. 4).

Alternatively, to reduce noise, instead of the instant measurements, to obtain $V_x$, $V_y$, the signal V may be integrated over a time interval which is shorter than $t_o$ 630. This, however, does not change the predictive algorithm and, hence, Equation (1) still holds. Equation (1) is true for the input step function. Generally, the input IR flux is not a step function (in reality, it may not be possible to insert a probe into the ear instantaneously). Thus, the IR sensor's initial response will differ from the exponential function. However, after stabilizing the probe 4 inside the ear canal, the signal $V_{ir}$ changes exponentially. To capture a period during which the function becomes exponential, more than one pair of measurements may be made with the repetitive calculation of the anticipated $V_{iro}$ using Equation (1) until a consistent value for the calculated $V_{iro}$ is achieved. Reaching identical predictions from the sequential pairs of the measurements indicates that the function is exponential and, hence, the predicted values are accurate. For example, the IR thermometer may keep taking measurements of the curve $V_{ir}$ every 0.5 sec., thereby collecting numbers $V_x$, $V_y$, $V_z$, etc. Then, several values of the predicted level $V_{iro}$ are calculated from pairs $V_x$ and $V_y$, $V_y$ and $V_z$, etc., until the calculated numbers become nearly equal to one another, indicating that the intended result is achieved. The thermal time constant $\tau$ is determined during calibration of the instrument.

It should be noted that the same predictive technique as described above can be used to improve the response speed of other types of thermal radiation sensors, for example—thermopiles. A typical thermopile thermal time constant is of the order of 30 milliseconds which allows achieving a steady-state response in about 1 second. The predictive technique of the invention reduces that time by about 10 times, thereby yielding a steady state level within about 100 milliseconds.

In view of the foregoing, it will be appreciated that the invention overcomes the long-standing need for an IR system and method for measuring temperature of an object accurately and efficiently. The invention implements a traditionally slow IR sensor, such as a bolometer, with a predictive algorithm to predict temperature of a subject without the need for waiting excessively. The invention may be embodied in other specific forms without departing from its spirit or essential characteristics. The described embodiment is to be considered in all aspects only as illustrative and not restrictive. The scope of the invention is, therefore, indicated by the appended claims rather than by the foregoing description. All changes which fall within the meaning and range of equivalency of the claims are to be embraced within their scope.

What is claimed is:

1. An infrared (IR) sensing assembly which measures temperature of an object, the sensing assembly comprising:

a substrate having a first surface and a second surface opposite the first surface;

a first sensing element connected to the first surface, wherein the first sensing element receives IR radiation from an IR source;

a second sensing element connected to the second surface, wherein the second sensing element is substantially shielded from IR radiation, the first and second sensing elements are substantially thermally separate from one another, and the first and second sensing elements exhibit a substantially similar response to IR radiation; and at least one thermal insulation layer bounded substantially on all sides by at least a portion of the substrate, at least a portion of the first sensing element, and at least a portion of the second sensing element, to maintain thermal separation between the first sensing element and the second sensing element.

2. The sensor assembly as defined in claim 1, wherein the at least one thermal insulation layer comprises a gap.

3. The sensor assembly as defined in claim 1, wherein the first sensing element faces a waveguide for receiving IR radiation.

4. The sensor assembly as defined in claim 1, wherein each of the first and second sensing elements comprises a thermistor.

5. The sensor assembly as defined in claim 1, wherein the first sensing element and second sensing element have a substantially rectangular shape.

6. An infrared (IR) sensing assembly which measures temperature of an object, the sensing assembly comprising:

at least one IR sensing element configured for exposure to one of an IR and an ambient source; and a processing circuit electrically connected to the at least one IR sensing element, the processing circuit receiving signals from the at least one IR sensing element and configured to predict in less than three seconds, due to the geometry and mounting of the at least one IR sensing element, a steady-state response of the at least one IR sensing element to exposure and thereby determining the temperature of the object.

7. The sensing assembly as defined in claim 6, wherein the at least one IR sensing element includes a first sensing element receiving IR radiation, and a second sensing element substantially shielded from IR radiation.

8. The sensing assembly as defined in claim 7, wherein each of the first sensing element and second sensing element comprise a thermistor.

9. The sensing assembly as defined in claim 7, wherein the first sensing element and second sensing element are electrically configured serially.

10. The sensing assembly as defined in claim 6, further comprising a bias circuit which compensates for a shift in the predicted response of the at least one IR sensing element.

11. A method of measuring temperature of an object using infrared (IR) radiation, the method comprising:

exposing at least one IR sensing element to IR radiation from the object to produce at least one instantaneous value of a response of the at least one IR sensing element;

predicting in less than three seconds, due to the geometry and mounting of the at least one IR sensing element, a steady-state response of the at least one IR sensing element to exposure; and determining temperature of the object based on the predicted steady-state response of the at least one IR sensing element.

12. The method as defined in claim 11, further comprising the step of determining temperature of a reference for use in the step of determining temperature of the object.

13. The method as defined in claim 11, further comprising the step of producing another at least one instantaneous value of a response of the at least one IR sensing element after a predetermined period of time.

14. The method as defined in claim 11, further comprising the step of predicting at least another steady-state response until the difference between at least two of the predicted steady-state responses is less than a predetermined value.

15. The method as defined in claim 11, wherein the step of determining temperature includes the step of determining a plurality of temperatures until the difference between at least two of the plurality of temperatures is less than a predetermined value.

16. An infrared (IR) sensing assembly which measures temperature of an object, the sensing assembly comprising:

at least one means for sensing IR radiation configured for exposure to one of an IR and an ambient source; and means responsive to signals received from the sensing means for predicting in less than three seconds, due to the geometry and mounting of the sensing means, a steady-state response of the sensing means to exposure and for determining temperature of the object based on the predicted steady-state response.

17. The sensing assembly as defined in claim 16, wherein the at least one sensing means includes a first means for sensing IR radiation, and a second means for sensing IR radiation which is substantially shielded from IR radiation.

18. The sensing assembly as defined in claim 17, wherein each of the first sensing means and second sensing means comprise a thermistor.

19. The sensing assembly as defined in claim 17, wherein the first sensing means and second sensing means are electrically configured serially.

20. The sensing assembly as defined in claim 16, further comprising means for compensating for a shift in the predicted response of the sensing means.

* * * * *